UNITED STATES PATENT OFFICE.

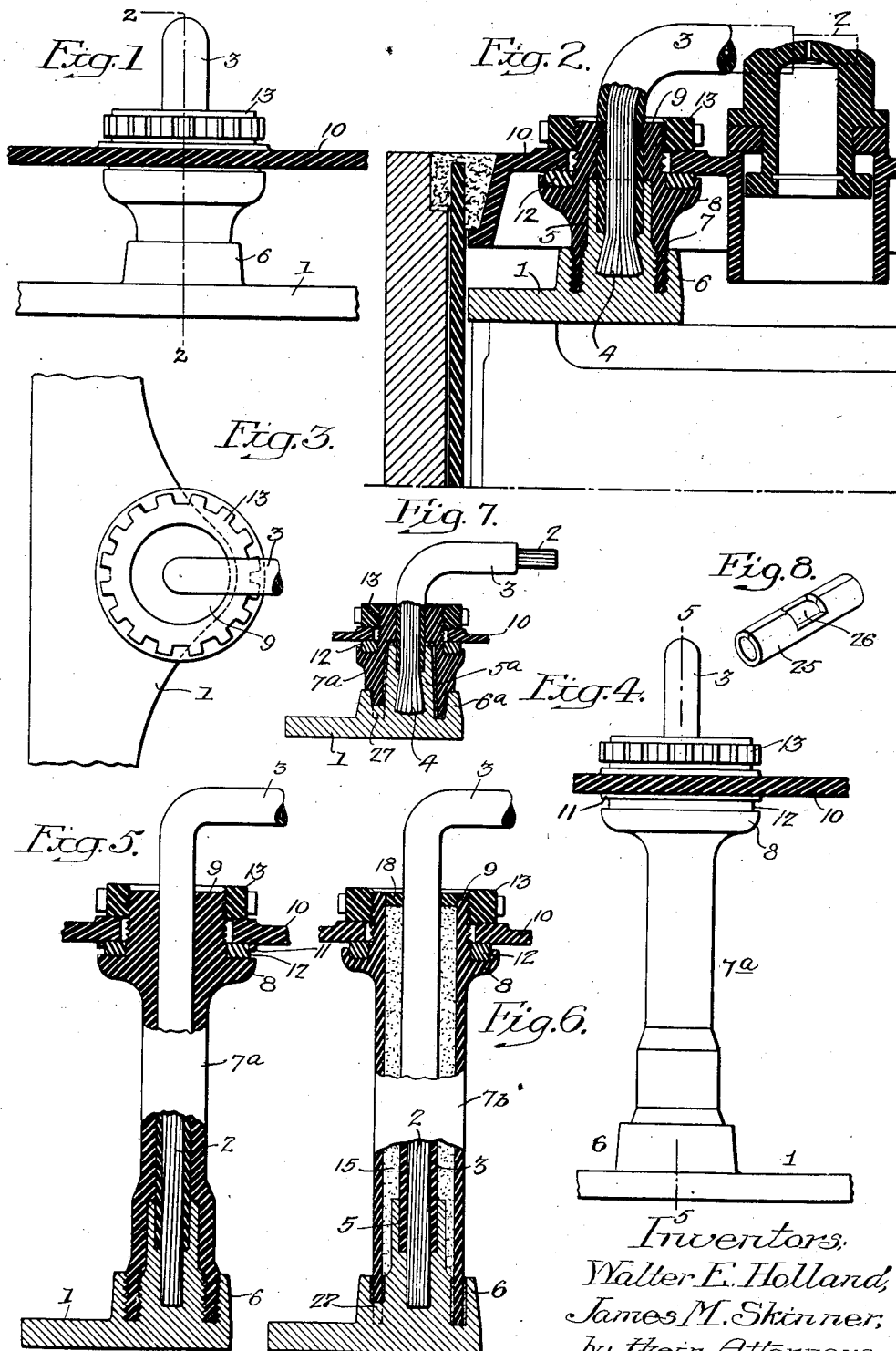

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

BATTERY CONNECTION.

1,371,093. Specification of Letters Patent. Patented Mar. 8, 1921.

Application filed July 8, 1919. Serial No. 309,473.

*To all whom it may concern:*

Be it known that we, WALTER E. HOLLAND and JAMES M. SKINNER, citizens of the United States, residing in Philadelphia, Pennsylvania, have invented Battery Connections, of which the following is a specification.

One object of this invention is to provide an insulated conductor and inter-cell- or terminal connection especially designed for use on storage batteries, which connection may be readily made as well as removed without the use of special apparatus or tools other than an ordinary soldering iron, and which also eliminates the dangers attendant upon the use of exposed metal connections at the top of a battery.

Another object of this invention is to provide a novel form of connection between an insulated or other conductor and the terminal strap of a storage battery cell, such as will insure not only the best electrical contact between these parts, but will in addition effectually exclude the acid or other electrolyte used in the cell from the joint and especially from the metal of the conductor;—it being noted that in this manner conductors of low resistance metals such as copper, which corrode in acid, may be carried down into or near the electrolyte.

A further object of our invention is to provide a novel form of flexible or other connection between the cells of a storage battery or between the end cells and the external circuit;—the construction being such as to reduce the electrical resistance as well as the weight of such connection.

These objects and other advantageous ends we attain as hereinafter set forth, reference being had to the accompanying drawings, in which, Figure 1 is a side elevation of one form of terminal post constructed in accordance with our invention;

Fig. 2 is a vertical section on the line 2—2, Fig. 1; together with certain of the parts ordinarily associated with our invention;

Fig. 3 is a plan of the structure shown in Fig. 1, with the battery cell cover removed;

Fig. 4 is an elevation of a slightly modified form of our invention;

Fig. 5 is a vertical section on the line 5—5, Fig. 4;

Figs. 6 and 7 are vertical sections of other modifications of our invention; and Fig. 8 is a perspective view of a sleeve which may be used in connecting the cable ends.

In the above drawings 1 represents a lead alloy strap which in a storage battery cell has connected to it the terminal lugs of one group of the plates and, according to the preferred embodiment of our invention, each of such straps of any battery cell is cast around or soldered to one end of a conductor 2, preferably so as to cover and inclose a portion of its insulating cover 3 as well as its projecting end. The strands of this end are preferably opened up or spread out, as indicated at 4, and that portion of the strap 1 immediately surrounding it and the adjacent end portion of the insulation has a generally cylindrical form, projecting in a line substantially at right angles to the plane of said strap.

The lower portion of this cylindrical extension 5 is preferably externally threaded or serrated, being surrounded by an integral internally threaded or serrated flange 6 spaced away from it to form a narrow annular cavity. Around this cylindrical projection 5 and the part of the insulated conductor 2—3 immediately adjacent thereto is then molded or otherwise applied a bushing 7 of hard rubber or other suitable insulating material, whose lower portion projects into and fills the annular cavity between the flange 6 and the projection 5. The upper end of this bushing is externally threaded and it is vulcanized or cemented in any suitable manner to form an integral connection with the adjacent portions of the rubber covering 3 of the conductor 2;—being formed with an annular flange 8 immediately below the threaded upper end 9 so as to present an annular face parallel with but spaced away from the under side of the cell cover 10, which is usually of hard rubber. Said cover is provided with an opening for the passage of the threaded upper end of the bushing 7 and its under face may have an annular rib or flange 11, Fig. 5, designed to confine a soft rubber or other suitable form of sealing gasket 12 between itself and the collar 8 of the bushing with a view to forming an acid tight joint between the latter and the cell cover. In order to insure close contact between the cover and this gasket, as well as to maintain the several parts in position, a sealing nut 13 of hard rubber or other suitable material is threaded on the upper end 9 of the bushing 7 and is set up sufficiently to clamp and compress the gasket in the desired manner.

With the above described arrangement of parts it will be seen that the bushing 7 makes a liquid-proof joint with the strap 1 and completely surrounds the end of the conductor 2—3, effectually excluding the acid or other electrolyte from the end portion 4 as well as from the other parts of the conductor 2. This latter is still further protected by the integral connection between its cover and the upper end 9 of the bushing 6, formed by vulcanizing or cementing these parts together, and any creeping or other leakage or splashing of electrolyte out of the battery cell is effectually prevented by the sealing nut 13 and sealing gasket 12.

In Figs. 4 and 5 we have illustrated a form of our invention particularly designed for use in so-called "non-spill" batteries in which the cover 10 of the cell is a considerable distance away from the alloy strap 1. In such cases the body 7$^a$ of the bushing is elongated between its collar 8 for the reception of the sealing gasket and its point of engagement with the strap 1, into which, as previously described, it is molded and vulcanized or otherwise connected so as to form a liquid-proof joint.

If desired, and without departing from our invention, we may form the bushing as indicated at 7$^b$ in Fig. 6, so that while its lower end is entered in an annular recess formed between the flange 6 of the strap 1 and the cylindrical projection 5 thereof and is cemented therein to provide an acid-proof joint, its body and upper portion are spaced away from the upper part of the projection 5 and from the insulation 3 surrounding the conductor 2, to form an elongated annular space which is filled with a sealing compound 15, being closed at the top by a ring 18 pressed into place before the compound hardens. As before, the upper end of the bushing 7$^b$ is provided with a flange 8 and has a sealing gasket 12 confined between this and the under side of the cover 10, said bushing being made to withstand turning strains by suitable means such as a key 6$^a$ which enters a keyway in its lower edge. The upper end 9 of said bushing is threaded above the collar and has mounted on it a hard rubber sealing nut 13 whereby the flange 8 and cover 10 are drawn together to compress the soft rubber gasket 12 so as to make an acid-proof joint.

To facilitate making the connection between the cable ends 2, a sleeve 25 (Fig. 8) preferably of thin metal, may be slipped over them after the insulation has been removed and the connection is then completed by pouring or running-in solder through an opening 26 therein;—the exposed metal parts being finally covered with tape or other suitable insulation.

In that form of the invention shown in Fig. 7 the construction is for the most part the same as that shown in Fig. 2 except that the threads or serrations are omitted from the interior of the flange 6$^a$ and from the projection 5$^a$, and the lower end of the bushing 7$^a$ is cemented into the annular cavity between these two parts. In order to positively hold the bushing from turning relatively to the strap 1, its lower edge is recessed or slotted for the reception of a projection or key 27 formed or fixed in the cavity between the flange 6$^a$ and the projection 5$^a$.

From the foregoing description it will be seen that the acid or other electrolyte is effectually excluded from the conductor leading from the strap, so that it cannot creep along and corrode the same or escape between said conductor and the bushing. Likewise there is no possibility of the escape of electrolyte past the sealing gasket between the bushing and the cover, since the insulating material of which the bushing is made does not corrode or tend to draw electrolyte over its surface as does metal, and also because of the relatively high compression of the gasket, and therefore the tight joint, which is made possible by the nature of the material of the bushing and nut permitting of the use of a relatively fine tread. Furthermore, the sealing nut will not jar loose in service although it may be removed readily when desired.

Again, the electrical resistance of the connections to or between the terminal lug straps of a storage battery is materially reduced by the use of our invention and that without possibility of damage to the copper or low resistance conductors from the electrolyte or of leakage of such electrolyte between the conductors and their insulating bushings or between the bushings and the cell covers.

We claim:

1. The combination of a conductor; insulating material thereon; with a battery cell strap cast around said conductor so as to make electrical connection with the end thereof as well as inclose the adjacent end portion of the insulating material thereon.

2. The combination of a conductor; insulating material thereon; with a battery cell strap cast around said conductor so as to make electrical connection with the end thereof and form a tight joint with the adjacent end portion of the insulating material thereon.

3. The combination of a conductor; an insulating covering thereon; a battery cell strap having a projection cast around said conductor so as to make electrical connection with the end thereof as well as inclose the adjacent end portion of the insulating covering thereon; with an insulating bushing surrounding said projection and making a liquid tight joint therewith.

4. The combination of a conductor; an insulating covering thereon; a terminal strap having a projection cast around said conductor so as to make electrical connection with the end thereof; with an insulating bushing surrounding said projection and making a liquid-tight joint therewith and with the insulating covering.

5. The combination of a battery cell strap; a low resistance conductor sweated directly into a portion of said strap; and insulating material making a liquid-tight connection with the strap and extended over a portion of the low resistance conductor.

6. The combination of a battery cell strap having an integral projecting portion; with a conductor of relatively low resistance embedded in said projecting portion and extending therethrough to a point adjacent its junction with the strap.

7. The combination of a battery cell strap having an integral projecting portion; a conductor of relatively low resistance embedded in said projecting portion and extending therethrough to a point adjacent its junction with the strap; and a protective insulating covering inclosing the projecting portion and making a liquid tight connection with said cell strap.

8. The combination of a battery cell strap having a projecting portion; a conductor connected to said projecting portion; with an insulating bushing cemented to the projecting portion and making a liquid-tight joint with the cell strap.

9. The combination with a battery cell strap having a projecting portion; a relatively low resistance conductor around which the material of said portion is cast extending in the same to a point adjacent the strap; insulating material for the conductor making a liquid-tight junction with the projecting portion; and an insulating bushing having a liquid-tight connection with the cell strap and mounted substantially coaxial with the projecting portion and with the conductor.

10. The combination with a battery cell strap having a projecting post; a relatively low resistance conductor around which the material of said post is cast extending in the same to a point adjacent the strap; insulating material for the conductor making a liquid-tight junction with the post; an insulating bushing around the conductor and having a liquid-tight connection with the cell strap; with an insulating filling between the bushing and the insulation of the conductor.

11. The combination of a relatively good electrical conductor having an insulating covering; a relatively poor conductor cast substantially concentrically around the first conductor; and an insulating bushing making liquid-tight connection both with the insulation and with said relatively poor conductor adjacent the junction of said two conductors.

12. The combination of a battery cell strap having a projecting terminal post; an electrical conductor embedded in said post; insulation on said conductor extending adjacent said post; with an insulating bushing keyed to the post and making a liquid-tight joint with said insulation.

13. The combination of a battery cell strap having a projecting portion and a flange surrounding said portion so as to form an annular recess; a key in the recess; a conductor embedded in the projecting portion; insulation for said conductor extending adjacent the strap projection; with an insulating bushing making a liquid-tight joint with said insulation and having a portion entering said annular recess in non-rotatable engagement with the key.

In witness whereof we affix our signatures.

WALTER E. HOLLAND.
JAMES M. SKINNER.